Oct. 13, 1970 — J. R. YOUNKIN — 3,533,297

STEPPED FORCE GYRO CASE ERECTION

Filed Oct. 23, 1967 — 2 Sheets-Sheet 1

INVENTOR
JAMES R. YOUNKIN

ATTORNEY

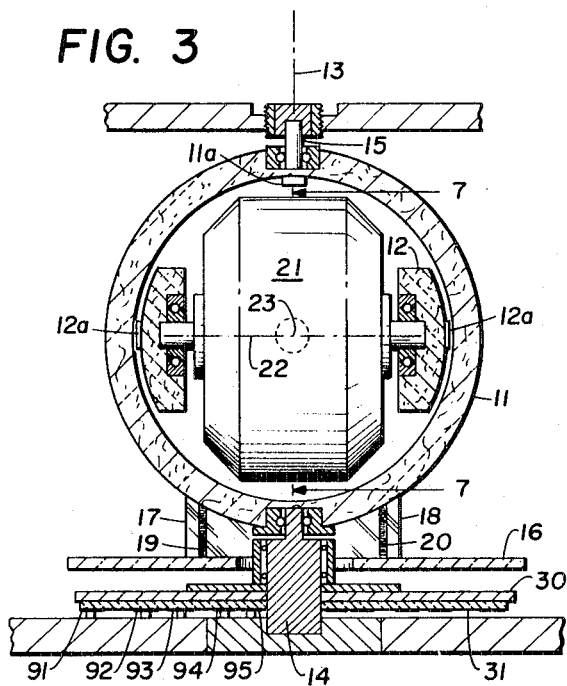

United States Patent Office 3,533,297
Patented Oct. 13, 1970

3,533,297
STEPPED FORCE GYRO CASE ERECTION
James R. Younkin, Mineral Wells, Tex., assignor to Thurman & Younkin, Inc., Mineral Wells, Tex., a corporation of Texas
Filed Oct. 23, 1967, Ser. No. 677,116
Int. Cl. G01c 19/30
U.S. Cl. 74—5.41                                8 Claims

ABSTRACT OF THE DISCLOSURE

Case erection is provided for a gimbal-mounted gyroscope wherein a balanced pick off senses rotation of the inner gimbal where the inner gimbal has a stepped indicator.

Means responsive to an error signal rotates the pick off relative to the inner gimbal to apply a force through a resilient link, coupling the pick off to an outer gimbal to torque the inner gimbal back to a reference position.

FIELD OF THE INVENTION

This invention relates to case erection for a gyroscope and more particularly, to application through a servo of a resilient force to an outer gimbal upon predetermined displacement of an inner gimbal.

PRIOR ART

Gimbal-mounted gyroscopes require prepositioning or erection for use in connection with sensing means, the output of which is indicative of the position in space of an air frame, for example, relative to the gyroscope. By reason of frictional forces and accelerations in the system, the gyroscope tends to precess thereby to change position and introduce error. Case erection systems heretofore have been known. However, the present invention is directed to a unique case erection system of highly simplified character.

SUMMARY

The present invention relates to the control of a gyro having an inner gimbal and an outer gimbal, the latter being mounted for rotation on a vertical axis. A follower is mounted adjacent the motor for rotation on the same vertical axis relative to the gyro. A pick off means is provided having one element on the follower and one element on the inner gimbal for producing an error signal upon relative rotation between the outer gimbal and the follower. The element mounted on the inner gimbal is stepped to change the null position of said pick off relative to said outer gimbal where the inner gimbal rotates on its axis beyond a predetermined angle. A servo is provided for rotating the follower and the pick off in dependence upon the magnitude of the error signal. A resilient coupling between the outer gimbal and the following is operative when the inner gimbal rotates beyond said predetermined angle to apply a torque through said outer gimbal to said inner gimbal to restore the inner gimbal back to its reference position.

THE DRAWINGS

FIG. 3 is a sectional view taken along lines 3—3 of FIG. 2;

FIG. 4 is a bottom view as taken along lines 4—4 of FIG. 2;

FIG. 5 illustrates registration of the pick off coil and a stepped vane mounted on the inner gimbal of FIG. 1;

FIG. 6 illustrates the displacement of the pick off to rebalance the pick off when the inner gimbal has rotated beyond a predetermined angle; and FIG. 7 is a view taken along lines 7—7 of FIG. 3.

PREFERRED EMBODIMENTS

Figure 1:
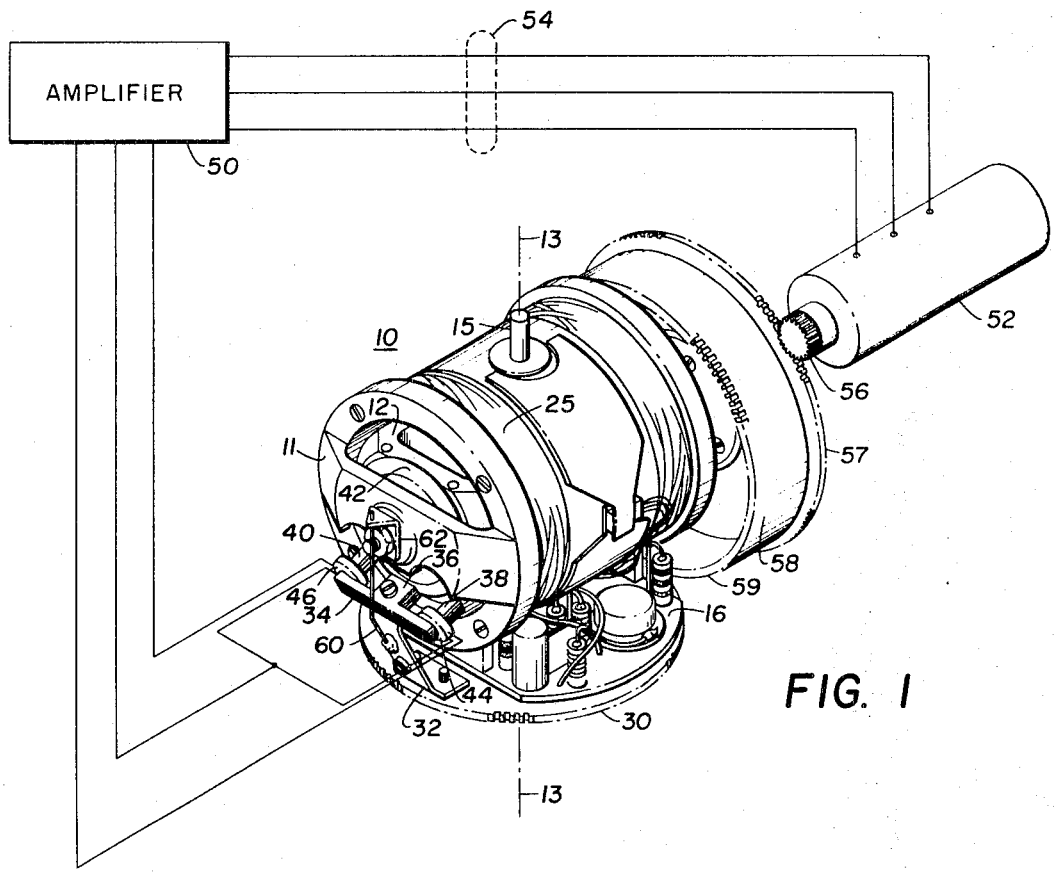
FIG. 1 is an isometric view, partially schematic, illustrating the present invention.

In FIG. 1, a gyro motor and servo system have been illustrated. The gyro motor 10 comprises an outer gimbal 11 and an inner gimbal 12. The outer gimbal 11 is mounted for rotation on a vertical axis 13. As best shown in FIG. 3, the outer gimbal 11 is mounted for rotation on the shaft 14 which supports the motor from the bottom and on an upper pin 15 which supports the gimbal 11 at the top. A plate 16 is mounted for rotation with the outer gimbal 11. As shown in FIG. 3, the plate 16 is secured by brackets 17 and 18 to the outer gimbal 11 by screws 19 and 20. The plate 16, as shown in FIG. 1, serves to support electrical components employed for driving the rotor in the gyro motor 10. As best shown in FIG. 3, the inner gimbal 12 journals a permanent magnet rotor 21. The inner gimbal 12 is pivotally mounted on the outer gimbal 11 for rotation about the axis 23. Axis 23 is perpendicular to the axis 22 on which the rotor 21 spins and is also perpendicular to the axis 13 on which the outer gimbal is mounted. In this system, the inner gimbal is freely rotatable on the axis 23. Stops 11a and 12a provide for arresting rotation at slightly less than ±90°.

As shown in FIG. 7, the rotor 21 is a permanent magnet rotor having a north pole N and a south pole S. A cylindrical winding 25 encircles the outer gimbal 11 and is energized by alternating current to apply a periodically reversing magnetic field with which the rotor 21 reacts to be driven at the speed synchronous with the alternating current in the coil 25. The gyro motor, its construction and starting circuit, will preferably be of the type described in applicant's copending application Ser. No. 395,361, filed Sept. 3, 1964, and now Pat. No. 3,324,733, for a Gyrosystem.

As best shown in FIGS. 1 and 3, a follower, including a gear 30 and a commutator plate 31, is mounted for rotation on the shaft 14 immediately below the plate 16. As best shown in FIG. 1, a pick off structure is mounted by means of a bracket 32 on the gear 30 and extends upwardly to support an E-shaped magnetic core 34. The core has a central pole 36 and end poles 38 and 40, which extend toward the end of the inner gimbal in a confronting relation. The poles 36, 38, and 40, are located as to be in registration with an iron ring 42 which is mounted on the end of the inner gimbal 12. Coils 44 and 46 are mounted on the poles 38 and 40, respectively. When the ends of the poles 38 and 40 are equally "shaded" by the ring 42, the output signal from the coils as applied to an amplifier 50 is a null. However, when the poles are unequally shaded, there will be an unbalance signal applied to the amplifier 50. This unbalance signal is employed in a conventional manner to energize a servo motor 52 by way of cable 54. The servo motor 52 is mounted rigidly on the gyro case which case also supports the pivot 14. The servo motor 52 has an output shaft on which a pinion 56 is mounted. The pinion drives a gear 57 which is mounted for rotation on an axis parallel to the axis of the motor 52 and perpendicular to axis 13 but in a plane which includes the axis 13. The gear 57 supports a hollow cylinder 58 which has a gear 59 formed on the free end thereof. The gear 59 engages the follower gear 30.

The present invention differs basically from any other case erection system by reason of the cooperation which exists between the uniquely shaped ring 42 and a spring 60 which is coupled from the bracket 32 to a bracket 62 secured to the outer gimbal 11. Through application of a resilient force to the outer gimbal by means of spring 60, case erection is accomplished. This force is applied in following rotation of the inner gimbal 12 through a predetermined angle. This causes displacement, by a predetermined step, of the gear 30 relative to the outer gimbal 11.

The foregoing operation may be understood by referring to FIGS. 5 and 6. In FIG. 5, it will be noted that the magnetic ring 42 has a relatively small width, $a$, over about three-quarters of its circumference and a larger width, $b$, over the remaining quarter of its circumference. Thus, there exist steps 42a and 42b which mark the transitions from a large width $b$ to a small width $a$ of the ring 42. The ends of the poles 38 and 40 are spaced to correspond with the spacing between the steps 42a and 42b. When the inner gimbal is vertically oriented, the poles 38 and 40 are equally shaded by the stepped zones of the ring 42. When equally shaded, the error signal from the pick off will be zero or null. The servo system operating through amplifier 50 and reversible motor 42 is responsive to relative angular displacements between the outer gimbal 11 and the follower 16 to slave the follower 16 to the outer gimbal. The error signal increases with displacement at a given rate, depending upon the system sensitivity.

Consider now the case shown in FIG. 6 where the inner gimbal is rotated such that the poles 38 and 40 would not be equally shaded. When the poles become unequally shaded by such rotation of the inner gimbal 12, the relative position between the follower and the outer gimbal at which the error signal is null is changed. As the inner gimbal rotates beyond a predetermined angle, for example, to the extent shown in FIG. 6, the servo system abruptly moves the gear 30, which supports the pick off, in direction and amount such that the poles are again equally shaded. However, the movement has to be such that pole 38 will be shaded by the large diameter section on the ring to the same degree that the pole 40 is shaded by the small width section of the ring 42. The magnitude of movement necessary to restore balance to the servo system is represented by the step $c$, FIG. 6. In the new position, the pick off system will continue to be slaved to the outer gimbal 11. However, by reason of the displacement $c$, a resilient force is applied through the spring 60 to the outer gimbal. This small resilient force continuously applied to the outer gimbal produces a force, by reason of the gyroscopic coupling in the system, which torques the inner gimbal 12 back to the vertical position shown in FIG. 5.

Figure 2:
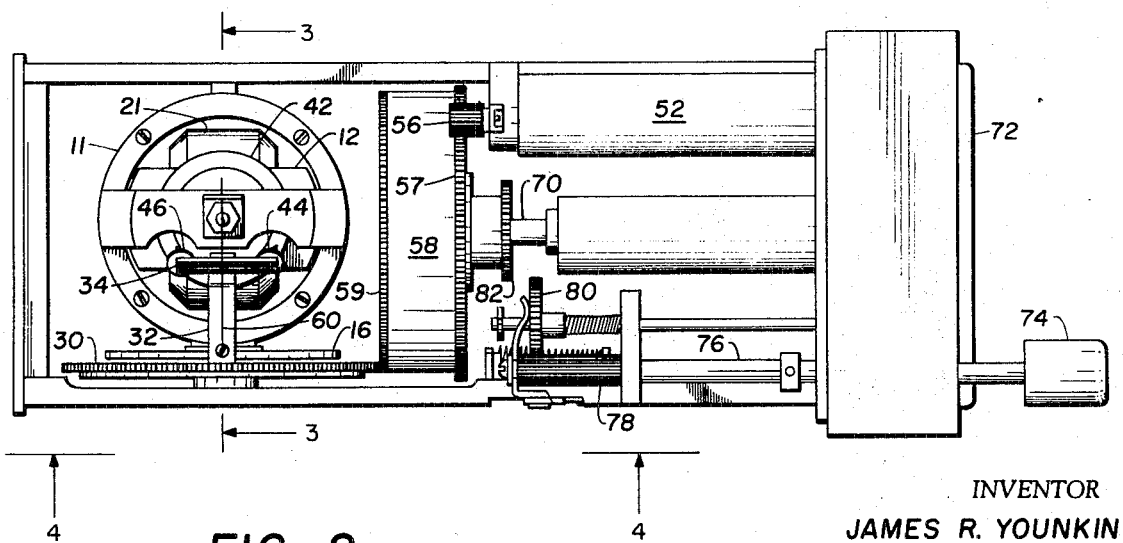
FIG. 2 is a side view of a gyro unit adapted to be mounted on an aircraft instrument panel.

As indicated in FIG. 2, the gyro system has a read out by way of shaft 70 which is coupled to the gear 57 and which controls a conventional display 72. The gyro can be manually set for heading, for example, by actuation of the control knob 74. The control knob 74 is mounted on a shaft 76 which carries an elongated gear 78 as well as an idler gear 80. When the knob 74 is depressed, the idler gear 80 is moved into registration with a gear 82 which is secured to the gear 57 and the shaft 70. Rotation of the knob, with gears 80, 82 enmeshed, will rotate the position of the gyro motor and at the same time will adjust the directional indication on the display 72.

As best shown in FIG. 4, the commutator disk 31 has five conductive rings 91–95 thereon which cooperate with brushes 101–105, respectively, for transmission of power and of the error signal to and from the rotatably mounted elements, respectively.

What is claimed is:
1. A case erection system for a gyroscope which comprises:
 (a) a gyro having an inner gimbal and an outer gimbal, the latter being mounted for rotation on a vertical axis,
 (b) a follower mounted on said vertical axis adjacent to said gyro for rotation relative to said outer gimbal,
 (c) means for sensing relative rotation between said outer gimbal and said follower to generate an error signal and including sensor means which has a null at one position of said follower relative to said outer gimbal when said inner gimbal is erect and at a different position when said inner gimbal is rotated on its axis beyond a predetermined angle,
 (d) means for rotating said follower on said axis in dependence upon said error signal, and
 (e) resilient means linking said follower to said outer gimbal for applying a force to said outer gimbal proportional to displacement of said different position for torquing said inner gimbal back to an erect position.

2. A case erection system for a gyroscope which comprises:
 (a) a gyro having an inner gimbal and an outer gimbal, the latter being mounted for free rotation on a vertical axis,
 (b) a follower mounted for rotation about said vertical axis adjacent to said gyro and having a normally balanced magnetic pick off which produces an error signal upon relative rotation between said outer gimbal and said follower,
 (c) magnetic means carried by said inner gimbal adjacent to said pick off having a stepped configuration for producing an abrupt change in the null positions of said follower and said outer gimbal when said inner gimbal rotates on its axis beyond a predetermined angle,
 (d) drive means responsive to said error signal for moving said follower relative to said motor to restore balance in said pick off, and
 (e) resilient means interconnecting said follower and said outer gimbal for applying a restoring force to said outer gimbal proportional to said change for erecting said inner gimbal.

3. A case erection system for a gyroscope which comprises:
 (a) a gyro having an inner gimbal and an outer gimbal, the latter being mounted for rotation on a vertical axis,
 (b) a follower mounted on said vertical axis adjacent to said gyro for rotation relative to said outer gimbal,
 (c) a magnetic ring mounted on said inner gimbal and having abrupt steps in ring diameter at spaced locations whereby said ring has a large diameter portion and a small diameter portion,
 (d) a normally balanced magnetic pick off having pole pieces confronting said ring and spaced apart in accordance with the spacing between said abrupt steps for producing an abrupt change in error signal when said inner gimbal rotates on its axis through a predetermined angle,
 (e) means for rotating said follower on said axis in dependence upon said error signal, and
 (f) resilient means linking said follower to said outer gimbal for applying a force to said outer gimbal proportional to displacement of said different position for torquing said inner gimbal back to an erect position.

4. The combination set forth in claim 3 wherein said resilient means comprises a spring linked to said outer gimbal in the region of the axis of said inner gimbal and cantilever supported at the other end on said follower in the region of said pick off for applying a resilient force to said outer gimbal proportional to said change for torquing said inner gimbal back to an erect position.

5. The combination set forth in claim 3 wherein said inner gimbal is provided with stop means to limit rotation to slightly less than ±90° relative to said vertical axis and wherein said steps, said pick off and said resilient means are substantially symmetrical with respect to said vertical axis.

6. The combination set forth in claim 1 wherein the means responsive to said error signal include a feedback loop for driving a reversible motor and a gear train, the last element of which is a gear mounted symmetrically to said vertical axis and forming a part of said follower.

7. The combination set forth in claim 1 wherein means are provided for manually selecting the angular position of said gyro on said vertical axis and for fixing the null position of said resilient means.

8. A case erection system for a gyroscope which comprises:
  (a) a gyro having an inner gimbal and an outer gimbal, the latter being mounted for rotation on a vertical axis,
  (b) a follower means mounted on said vertical axis adjacent to said gyro adapted normally to track a reference point on said outer gimbal,
  (c) means responsive to rotation of said inner gimbal to shift said reference point, and
  (d) resilient means linking said follower means to said outer gimbal for applying a restoring force to said outer gimbal proportional to the shift in said reference point for torquing said inner gimbal.

References Cited

UNITED STATES PATENTS

| 1,906,719 | 5/1933 | Richter | 74—5.41 |
| 2,411,087 | 11/1946 | Ford et al. | 74—5 |
| 2,608,868 | 9/1952 | Buhl | 74—5.47 |
| 2,699,681 | 1/1955 | Johnson | 74—5.41 |
| 2,992,563 | 7/1961 | Lassen | 74—5.47 |

FRED C. MATTERN, Jr., Primary Examiner

M. A. ANTONAKAS, Assistant Examiner

U.S. Cl. X.R.

74—5.6